(12) United States Patent
Yoshida et al.

(10) Patent No.: US 12,617,272 B2
(45) Date of Patent: May 5, 2026

(54) ACCELERATOR DEVICE

(71) Applicant: DENSO CORPORATION, Kariya-city (JP)

(72) Inventors: Yusuke Yoshida, Kariya-city (JP); Soichi Kinouchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/029,197

(22) Filed: Jan. 17, 2025

(65) Prior Publication Data

US 2025/0162411 A1 May 22, 2025

Related U.S. Application Data

(63) Continuation of application No. PCT/JP2023/029665, filed on Aug. 17, 2023.

(30) Foreign Application Priority Data

Aug. 29, 2022 (JP) ................................ 2022-135477

(51) Int. Cl.
*B60K 26/02* (2006.01)

(52) U.S. Cl.
CPC .................................. *B60K 26/021* (2013.01)

(58) Field of Classification Search
CPC .................. B60K 26/02; B60K 26/021; B60K 2026/023; G05G 1/44; G05G 5/03
See application file for complete search history.

(56) References Cited

U.S. PATENT DOCUMENTS

| | | | | |
|---|---|---|---|---|
| 8,332,116 B2 * | 12/2012 | Takiguchi | ............ | B60K 26/021 |
| | | | | 180/65.265 |
| 8,433,492 B2 * | 4/2013 | Shiomi | ................ | B60K 26/021 |
| | | | | 180/170 |
| 8,457,855 B2 * | 6/2013 | Sakaguchi | ........... | B60K 26/021 |
| | | | | 701/79 |
| 8,532,900 B2 * | 9/2013 | Maruyama | .............. | F02D 11/02 |
| | | | | 701/79 |
| 8,620,554 B2 * | 12/2013 | Sakaguchi | ........... | B60K 26/021 |
| | | | | 701/79 |
| 9,464,578 B2 * | 10/2016 | Shiomi | ................ | B60K 26/021 |
| 9,533,572 B2 * | 1/2017 | Sakaguchi | ............... | G05G 5/03 |
| 10,836,253 B2 * | 11/2020 | Inoue | .................... | B60T 8/4081 |
| 2010/0250084 A1 | 9/2010 | Takiguchi | | |

FOREIGN PATENT DOCUMENTS

JP          2010030548 A          2/2010

\* cited by examiner

*Primary Examiner* — Adam D Rogers
(74) *Attorney, Agent, or Firm* — Nixon & Vanderhye P.C.

(57) ABSTRACT

An accelerator device includes a pedal lever, a drive source, a power transmission mechanism, and a control unit. The pedal lever is operable in response to a pedaling operation. The drive source generates a driving force when being energized. The power transmission mechanism transmits the driving force of the drive source to the pedal lever, and applies a reaction force in an opposite direction to a pedaling direction of the pedal lever. The control unit includes a reaction force controller that controls the reaction force applied to the pedal lever by controlling the drive source. The reaction force controller holds an initial reaction force for a reaction force hold time from a start of reaction force application, and performs a reaction force reduction control in which the reaction force is reduced as a time function after an elapse of the reaction force hold time.

10 Claims, 7 Drawing Sheets

ACCELERATOR DEVICE

CROSS REFERENCE TO RELATED APPLICATION

The present application is a continuation application of International Patent Application No. PCT/JP2023/029665 filed on Aug. 17, 2023, which designated the U.S. and claims the benefit of priority from Japanese Patent Application No. 2022-135477, filed on Aug. 29, 2022. The entire disclosures of all of the above applications are incorporated herein by reference.

TECHNICAL FIELD

The present disclosure relates to an accelerator device.

BACKGROUND

Conventionally, a reaction force device that controls a reaction force against an accelerator pedal is known. For example, the reaction force is reduced when a pedaling speed exceeds an acceleration intention boundary threshold, and the reaction force is maintained when the pedaling speed is lower than the acceleration intention boundary threshold.

SUMMARY

An accelerator device according to one aspect of the present disclosure includes a pedal lever, a drive source, a power transmission mechanism, and a control unit. The pedal lever is operable in response to a pedaling operation. The drive source is configured to generate a driving force when being energized. The power transmission mechanism is configured to transmit the driving force of the drive source to the pedal lever, and to apply a reaction force in an opposite direction to a pedaling direction of the pedal lever. The control unit includes a reaction force controller configured to control the reaction force applied to the pedal lever by controlling the drive source. In addition, when a reaction force application condition is satisfied during a vehicle travel, the reaction force controller is configured to hold an initial reaction force for a reaction force hold time from a start of the reaction force applied to the pedal lever, and to perform a reaction force reduction control in which the reaction force is reduced by a time function after an elapse of the reaction force hold time. In such manner, the reaction force can be appropriately applied.

BRIEF DESCRIPTION OF THE DRAWINGS

The above and other objects, features and advantages of the present disclosure will become more apparent from the following detailed description taken in conjunction with the accompanying drawings. In the drawings.

DETAILED DESCRIPTION

Figure 1:
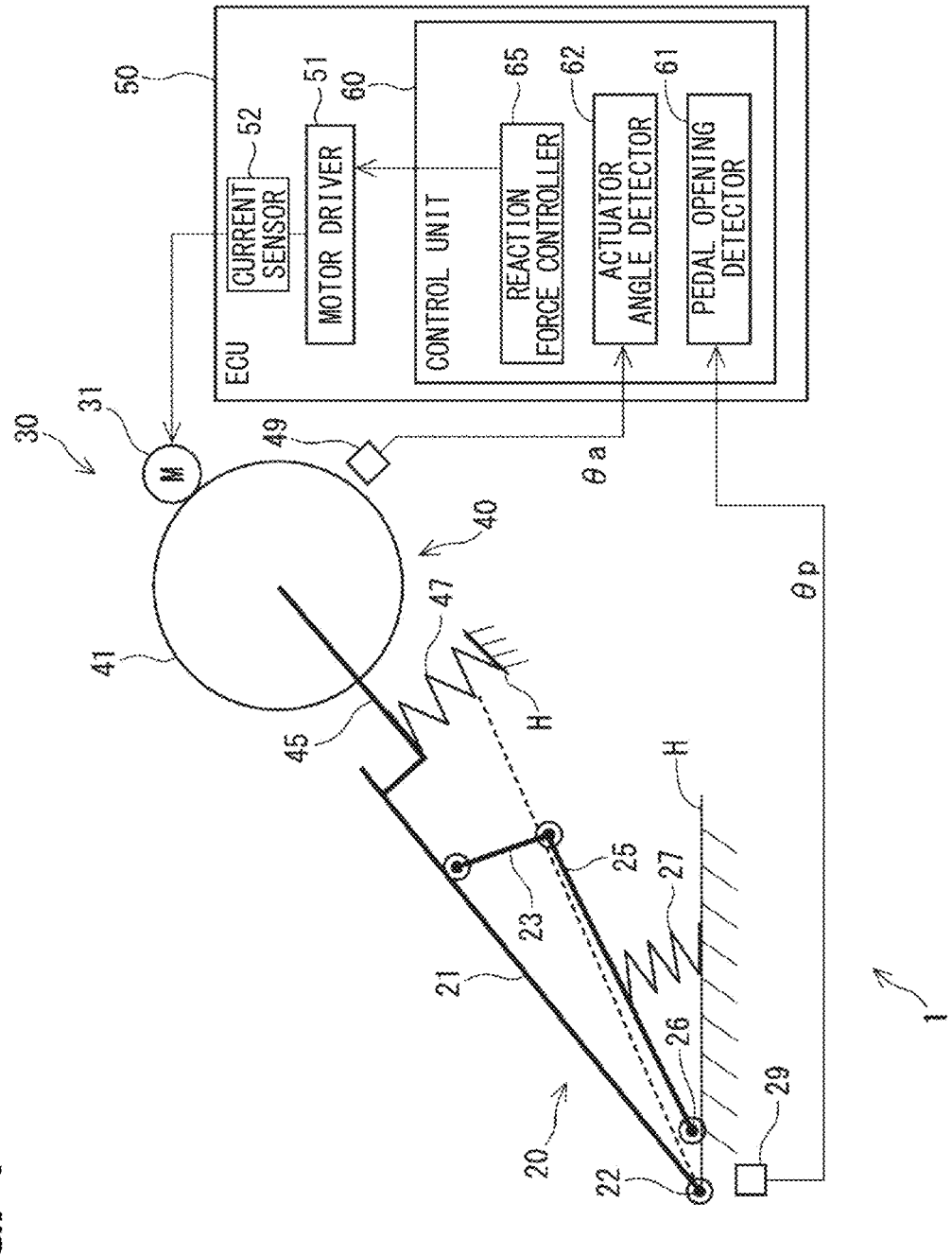
FIG. 1 is a schematic diagram showing an accelerator device according to a first embodiment.

In a reaction force device that controls a reaction force against an accelerator pedal, the reaction force may be reduced when a pedaling speed exceeds an acceleration intention boundary threshold, and the reaction force may be maintained when the pedaling speed is lower than the acceleration intention boundary threshold.

For example, when a moderate acceleration is determined, a reaction force is maintained. When a driver continues to step on a pedal at a moderate pedaling speed with an intention to accelerate, a pedal operability may deteriorate due to the reaction force maintained at a constant level.

It is an object of the present disclosure to provide an accelerator device that is capable of appropriately applying a reaction force.

In an accelerator device according to one aspect of the present disclosure, when a reaction force application condition is satisfied during a vehicle travel, a reaction force controller holds an initial reaction force for a reaction force hold time from a start of a reaction force applied to a pedal lever, and to perform a reaction force reduction control in which the reaction force is reduced by a time function after an elapse of the reaction force hold time. In such manner, the reaction force can be appropriately applied.

First Embodiment

Hereinafter, an accelerator device according to the present disclosure is described with reference to the drawings. In the following plural embodiments, substantially same structural configurations are designated with the same reference numerals thereby to simplify the description. The first embodiment is described with reference to FIGS. 1 to 5.

As shown in FIG. 1, an accelerator device 1 includes a pedal lever 20, a motor 31, a power transmission mechanism 40, an ECU 50, and the like.

The pedal lever 20 includes a pad 21, an arm 23, and a pedal 25, and is driven integrally by a pedaling operation of a driver or the like. The pad 21 is provided to be operable by the pedaling operation of the driver. The pad 21 is rotatably supported by a fulcrum member 22 provided in a housing H. FIG. 1 illustrates a so-called floor-type (organ-type) pedal in which the pad 21 is provided to extend in a direction along one surface of the housing H. However, a suspension-type (pendant-type) pedal may also be used. In the present embodiment, housing parts that are not driven by a drive of the motor 31 or by the pedaling operation of the pedal lever 20, such as a pedal housing, a motor housing, and the like, are collectively referred to as the "housing H".

The arm 23 connects the pad 21 and the pedal 25. The pedal 25 has one end rotatably supported by the housing H with a fulcrum member 26 and an another end connected to the arm 23. In such manner, when the driver operates the pad 21, the pad 21, the arm 23 and the pedal 25 are driven in an integrated manner. A pedal opening sensor 29 that detects a pedal opening (i.e., pedal angle) is provided on one end side of the pedal 25.

A pedal biasing member 27 is a compression coil spring. One end of the pedal biasing member 27 is fixed to the pedal 25 and an another end of the pedal biasing member 27 is fixed to the housing H, so as to bias the pedal 25 in an accelerator closing direction. In FIG. 1, a position of the pad 21 when an accelerator is fully opened is indicated by a broken line.

The motor 31 is, for example, a DC motor with brushes. The driving force of the motor 31 is transmitted to the pedal lever 20 via the power transmission mechanism 40. Here, a series of components that transmit power from the motor 31, which is a drive source, to the pedal lever 20 via the power transmission mechanism 40, is designated as an actuator 30.

The power transmission mechanism 40 includes a gear set 41, an actuator lever 45, an actuator lever biasing member 47 and the like. The gear set 41 is made of a motor gear that rotates integrally with a motor shaft and a plurality of gears that mesh with the motor gear, and transmits the driving force of the motor 31 to the actuator lever 45. A position sensor 49 detects a rotation position of any of the gears that are made to configurate the gear set 41.

The actuator lever 45 has one end connected to the gear set 41 and an other end abutting against the pedal lever 20. In such manner, the driving force of the motor 31 is transmitted to the pedal lever 20 via the power transmission mechanism 40. In FIG. 1, the other end of the actuator lever 45 abuts against the pad 21, but it may be configured that the other end of the actuator lever 45 abuts against the arm 23 or the pedal 25. The actuator lever biasing member 47 is a compression coil spring that biases the actuator lever 45 in a reaction force application direction, and maintains an abutment state of the actuator lever 45 abutting with the pedal lever 20.

The ECU 50 includes a motor driver 51, a current sensor 52, a control unit 60 and the like. The motor driver 51 has a switching element (not shown) for switching a supply of electric current to the motor 31. The current sensor 52 detects electric current flowing through the motor 31.

The control unit 60 is mainly made of a microcomputer and the like, and internally includes, although not shown in the drawing, a CPU, a ROM, a RAM, an I/O, a bus line for connecting these components, and the like. Each of processes executed by the control unit 60 may be software processing or may be hardware processing. The software processing may be implemented by causing the CPU to execute a program, which is stored in advance in a memory device such as a ROM, that is, in a computer-readable, non-transitory, tangible storage medium. The hardware processing may be implemented by a dedicated electronic circuit. In FIG. 1, each functional block is illustrated as being configured by one control unit 60, but some functions may be configured by other ECUs.

The control unit 60 includes, as functional blocks, a pedal opening detector 61, an actuator angle detector 62, a reaction force controller 65, and the like. The pedal opening detector 61 acquires a detection value of the pedal opening sensor 29 and detects a pedal angle θp, which is an amount of pedaling of the pedal lever 20 from a fully-closed position. Further, the pedal opening detector 61 calculates a pedaling speed Vp based on the detection value of the pedal opening sensor 29. In FIG. 1, the detection value is directly acquired from the pedal opening sensor 29, but the detection value may be acquired by communication from a device such as a higher-level ECU or the like.

The actuator angle detector 62 detects an actuator angle θa based on a detection value of the position sensor 49. The actuator angle θa is a rotation angle of the actuator lever 45 based on a state in which the actuator lever 45 abuts against the pedal lever 20 in the fully-closed position. The reaction force controller 65 controls the drive of the motor 31 to control the reaction force applied to the pedal lever 20. In the present embodiment, an electric current feedback control is performed to acquire a desired reaction force.

The reaction force controller 65 applies a reaction force to the pedal lever 20 by energizing the motor 31 in response to, for example, the pedal angle θp that deteriorates fuel efficiency, a vehicle speed or the like. Here, for example, when a driver continues to pedal the pedal lever 20 at a moderate pedaling speed with an intention to accelerate, if a constant reaction force continues to be applied, it may make a pedaling of the pedal lever 20 difficult, and operability may deteriorate.

When a reaction force is applied to the pedal lever 20, an initial reaction force F0 corresponding to an operation mode is maintained for a reaction force hold time Xh, and after the reaction force hold time Xh has elapsed from the start of reaction force application, the reaction force is gradually reduced to original pedaling characteristics as a function of time. In such manner, a sense of discomfort to be felt by the driver when he or she continues to pedal the pedal lever 20 with the intention to accelerate is mitigable, and enables smooth pedaling operation regardless of whether a vehicle is accelerating steeply or moderately.

Figure 2:
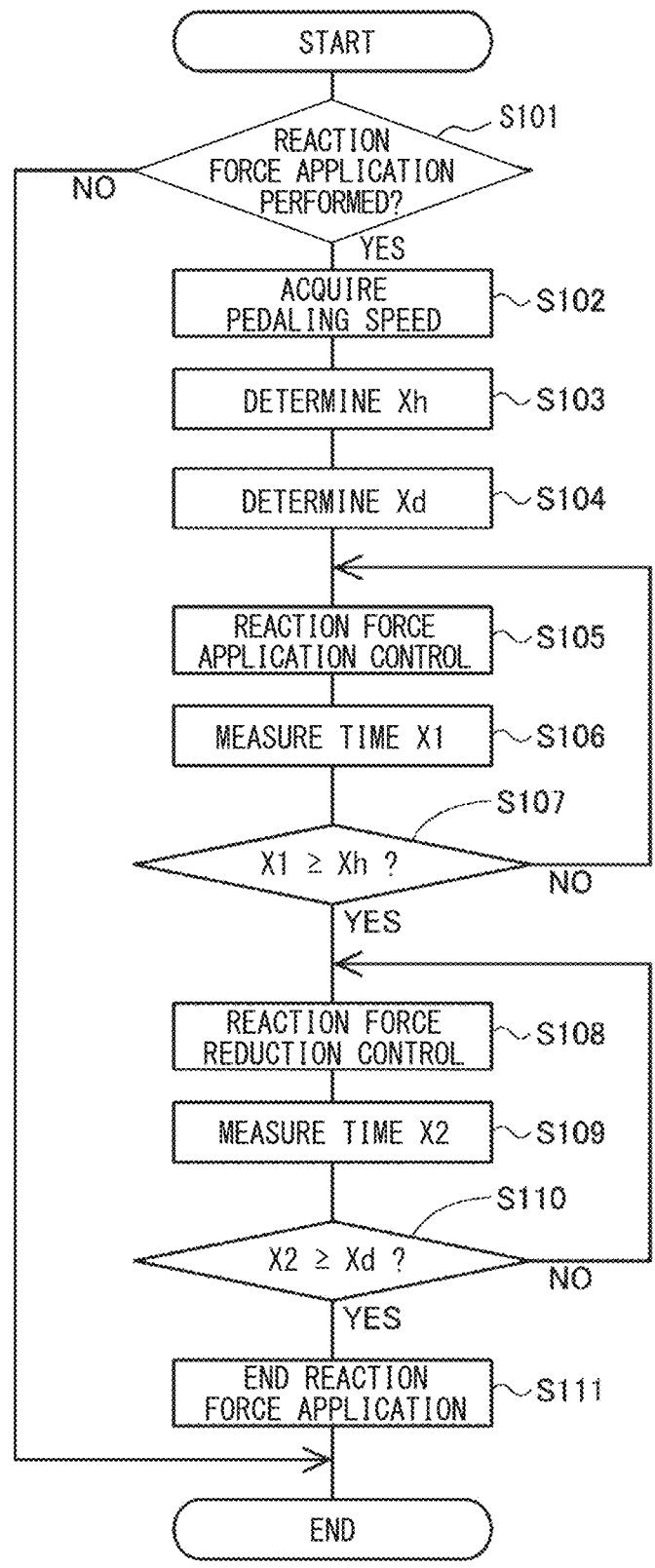
FIG. 2 is a flowchart for explaining a reaction force application control according to the first embodiment.

A reaction force application control process of the present embodiment is described with reference to a flowchart of FIG. 2. This process is performed by the control unit 60 at a predetermined cycle. Hereinafter, "step" in step S101 or the like is omitted, by simply replacing it with a symbol "S".

In S101, the control unit 60 determines whether or not to perform reaction force application control. Here, an affirmative determination is made when the pedal angle θp becomes equal to or greater than a reaction force application start angle θp_th. An affirmative determination may be made when an acceleration A of the vehicle becomes equal to or greater than a determination threshold A_th. Further, the determination may be made using parameters other than the pedal angle θp and the acceleration A of the vehicle, or may be made based on an instruction from the other ECU or the like. When it is determined that the reaction force application control is not to be performed (S101: NO), the process from S102 onwards is skipped and the motor 31 is not energized. When it is determined that the reaction force application control is to be performed (S101: YES), the process proceeds to S102.

In S102, the reaction force controller 65 acquires a current pedaling speed of the pedal lever 20 as a pedaling speed Vs at a control start time. In S103, the reaction force controller 65 determines the reaction force hold time Xh based on the pedaling speed Vs at the control start time. In S104, the reaction force controller 65 determines a reaction force reduction time Xd based on the pedaling speed Vs at the control start time. The setting of the reaction force hold time Xh and the reaction force reduction time Xd is described later. In S105, the control unit 60 performs reaction force application control to apply the initial reaction force F0 of a predetermined amount according to the operation mode. In S106, the control unit 60 measures an elapse time X1 from the start of reaction force application.

In S107, the control unit 60 determines whether or not the elapse time X1 from the start of reaction force application is equal to or longer than the reaction force hold time Xh. When it is determined that the elapse time X1 from the start of reaction force application is less than the reaction force hold time Xh (S107: NO), the process proceeds to S105, and reaction force application control is continued with the initial reaction force F0. When it is determined that the elapse time X1 from the start of reaction force application is equal to or longer than the reaction force hold time Xh (S107: YES), the process proceeds to S108.

In S108, the control unit 60 performs reaction force reduction control so that the reaction force becomes 0 after an elapse of the reaction force reduction time Xd. In S109, the control unit 60 measures an elapse time X2 from the start of the reaction force reduction control.

In S110, the control unit 60 determines whether or not the elapse time X2 from the start of the reaction force reduction control is equal to or longer than the reaction force reduction time Xd. When it is determined that the elapse time X2 from the start of the reaction force reduction control is less than the reaction force reduction time Xd (S110: NO), the process returns to S108 and the reaction force reduction control is continued. When it is determined that the elapse time X2 from the start of the reaction force reduction control is equal to or longer than the reaction force reduction time Xd (S110: YES), the process proceeds to S111, the power supply to the motor 31 is turned off, and the application of the reaction force is terminated.

Figure 3:
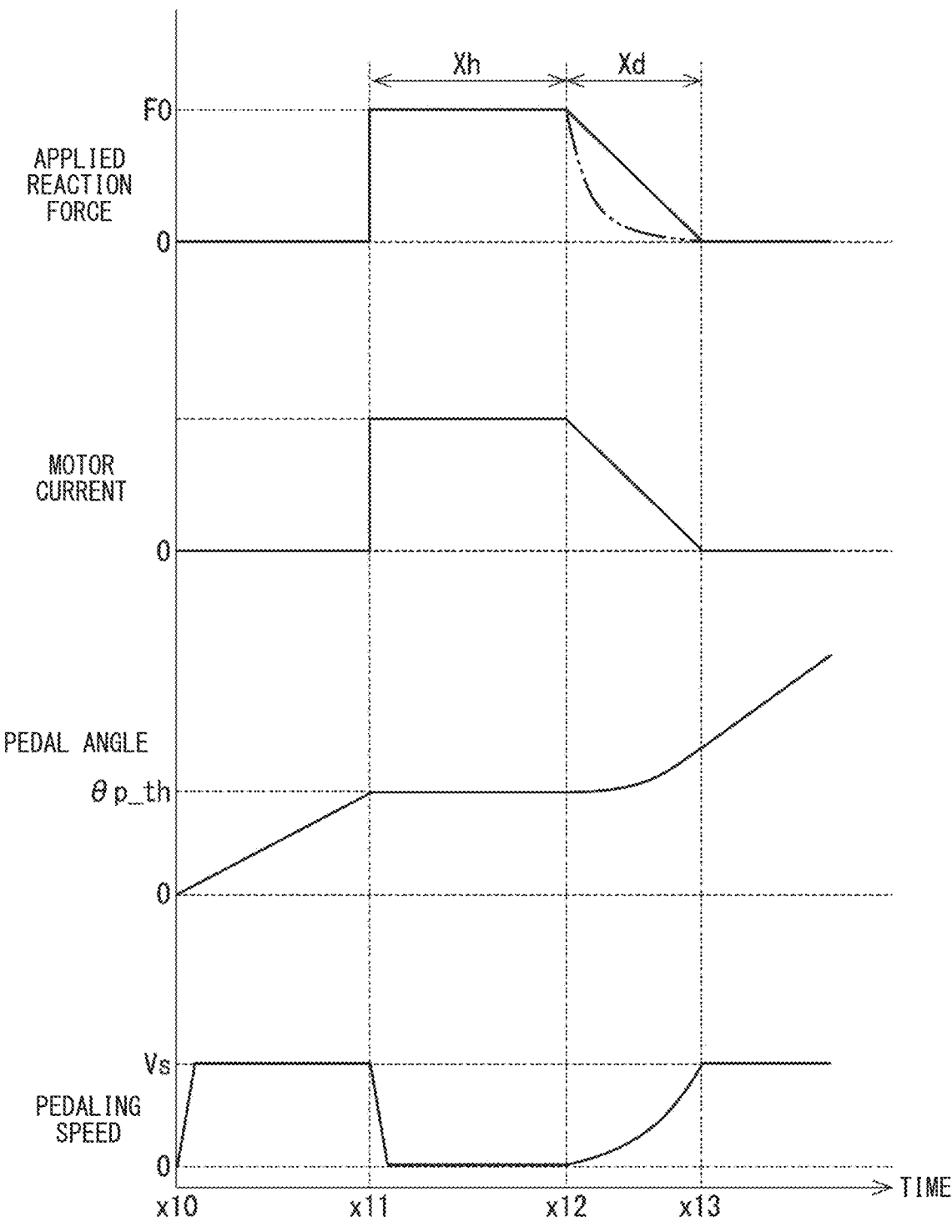
FIG. 3 is a time chart for explaining the reaction force application control according to the first embodiment.

The reaction force application control of the present embodiment is described with reference to a time chart of FIG. 3. In FIG. 3, the horizontal axis represents a common time axis, and from the top, an applied reaction force, a motor current, a pedal opening degree, and a pedaling speed are shown.

When the pedal lever 20 is pedaled from time x10, no electric current is applied to the motor 31 and no reaction force is applied to the pedal lever 20 until time x11 when the pedal angle θp becomes the reaction force application start angle θp_th.

At time x11, when the pedal angle θp reaches the reaction force application start angle θp_th, the drive of the motor 31 is controlled so that a predetermined initial reaction force F0 according to the operation mode is applied. At such timing, the driver increases the pedaling force to balance the applied reaction force, thereby maintaining the pedal position. The pedal position may change depending on the pedaling force applied by the driver. The pedaling speed at time x11 in which a reaction force application starts is defined as the pedaling speed Vs at a control start time, and the reaction force hold time Xh and the reaction force reduction time Xd are set based on the pedaling speed Vs at the control start time.

Figure 4:
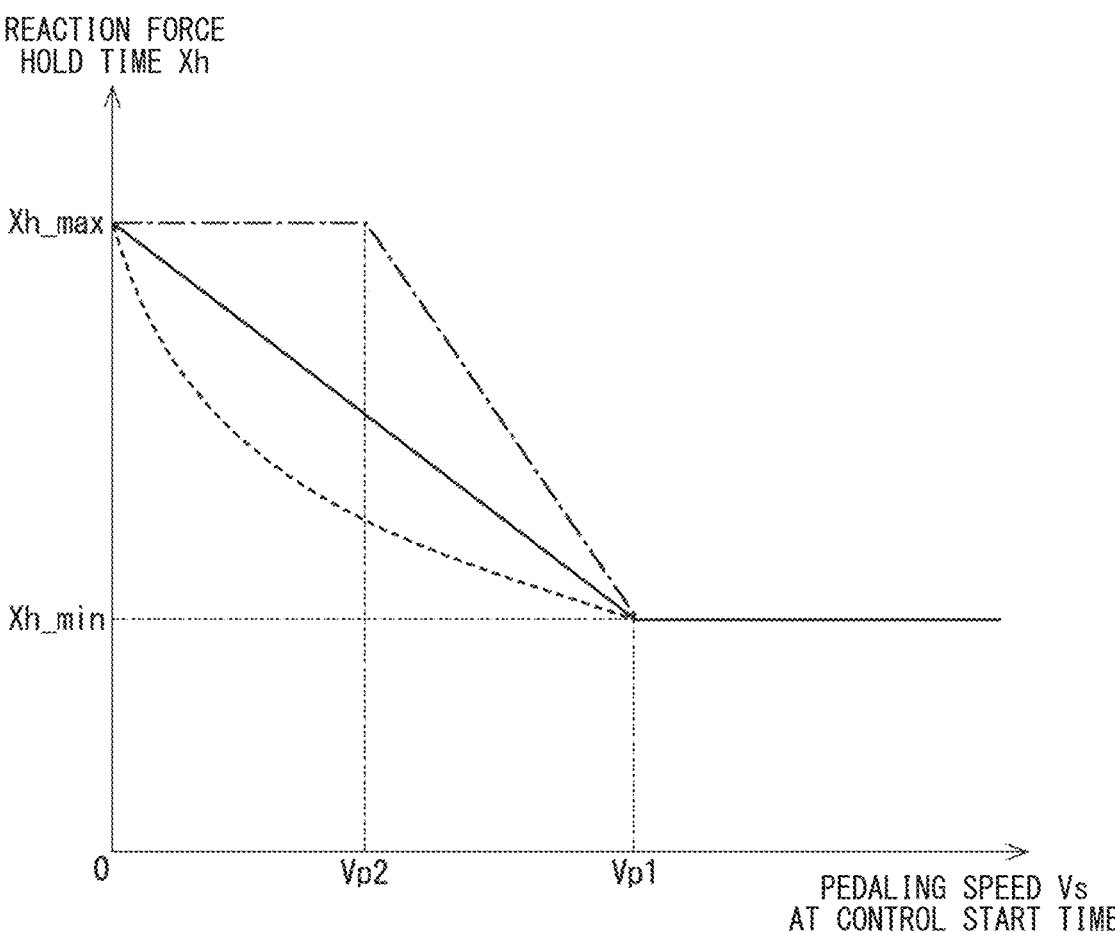
FIG. 4 is a graph for explaining a setting of a reaction force hold time according to the first embodiment.

The setting of the reaction force hold time Xh is described with reference to FIG. 4. As indicated by the solid line, the reaction force hold time Xh is set to become shorter from a maximum value Xh_max as the pedaling speed Vs at the control start time increases, up to a predetermined value Vp1. When the pedaling speed Vs at a control start time is greater than the predetermined value Vp1, the reaction force hold time Xh is set to a minimum hold time Xh_min. When the pedaling speed Vs at the control start time is high, there is a high probability that the driver has a strong intention to accelerate, and smooth pedaling operation according to such an intention is realized by shortening the reaction force hold time Xh, which reduces a duration of time during which the driver feels that pedaling is being hindered.

The relationship between the pedaling speed Vs at the control start time and the reaction force hold time Xh may be linear as shown by the solid line, or non-linear as shown by the broken line, in a region where the pedaling speed Vs at the control start time is equal to or less than the predetermined value Vp1. Further, as shown by a one-dot chain line, the reaction force hold time Xh may be set (a) to the maximum value Xh_max when the pedaling speed Vs at the control start time is in a range equal to or below a value Vp2, and (b) to a value shorter than the maximum value Xh_max according to the pedaling speed Vs at the control start time in a range Vp2<Vs≤Vp1. Though the one-dot chain line shows an example of the reaction force hold time Xh being set to become linearly shorter in the range Vp2<Vs≤Vp1, the reaction force hold time Xh may also be set to become non-linearly shorter.

Figure 5:
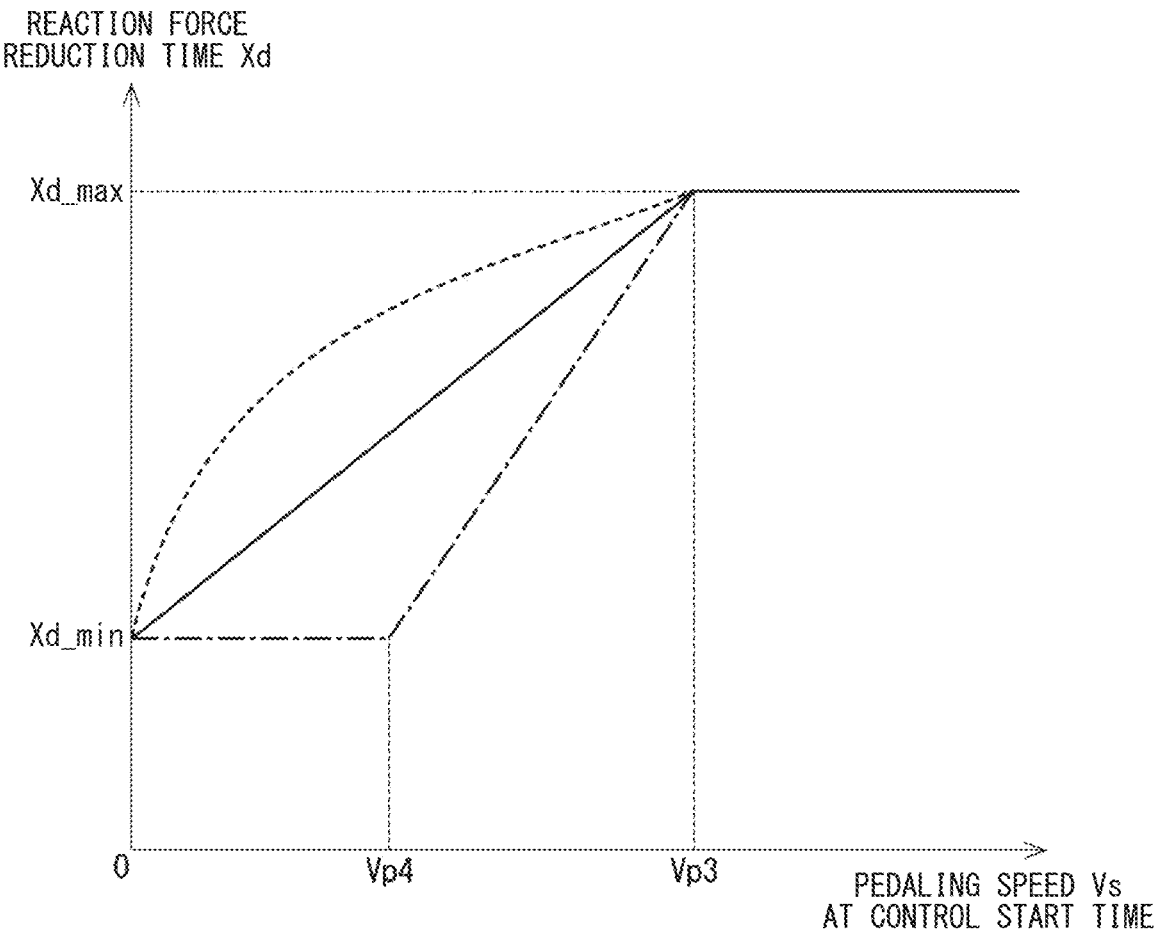
FIG. 5 is a graph for explaining a setting of a reaction force reduction time according to the first embodiment.

The setting of the reaction force reduction time Xd is described with reference to FIG. 5. As indicated by the solid line, the reaction force reduction time Xd is set to become longer from a minimum value Xd_min as the pedaling speed Vs at the control start time increases, up to a predetermined value Vp3. When the pedaling speed Vs at the control start time is greater than the predetermined value Vp3, the reaction force reduction time Xd is set to a maximum reduction time Xd_max. The predetermined values Vp1 and Vp3 may be the same value or different values. The same applies to values Vp2 and Vp4.

When the pedaling speed Vs at the control start time is high, if the reaction force reduction time Xd is short, the reaction force will steeply decrease, which may cause the driver to over-pedal the pedal lever 20. Therefore, by increasing the reaction force reduction time Xd for decreasing a reaction force reduction speed, it is possible to achieve smooth pedaling operation while preventing over-pedaling.

The relationship between the pedaling speed Vs at the control start time and the reaction force reduction time Xd may be linear as shown by the solid line, or may be non-linear as shown by the broken line, in a region where the pedaling speed Vs at the control start time is equal to or less than the predetermined value Vp3. Further, as shown by the one-dot chain line, the reaction force reduction time Xd may be set to the minimum value Xd_min when the pedaling speed Vs at the control start time is in a range equal to or lower than the value Vp4, and may be set to become longer according to the pedaling speed Vs at the control start time in a range Vp4<Vs≤Vp3. Though the one-dot chain line shows an example of the reaction force reduction time Xd being set to increase linearly in the range Vp4<Vs≤Vp3, the reaction force reduction time Xd may also be set to increase non-linearly.

Returning to FIG. 3, the initial reaction force F0 is maintained from time x11, which is a reaction force application start timing, to time X12, when the set reaction force hold time Xh has elapsed. During the reaction force hold time Xh, the initial reaction force F0 is maintained and pedaling of the pedal lever 20 is suppressed in order to prevent deterioration of fuel efficiency, and the like.

At time x12 when the reaction force hold time Xh has elapsed from the start of reaction force application, reaction force reduction control is started. In the reaction force reduction control, the applied reaction force is reduced as a function of time F=f(t), so that (i) the applied reaction force becomes 0 at time x13 after an elapse of the reaction force reduction time Xd, and (ii) the original pedaling characteristics are restored. A reaction force reduction curve in the reaction force reduction control may be linear as shown by the solid line, or may be non-linear as shown by a two-dot chain line. After time x13, the applied reaction force becomes 0, restoring the original pedaling characteristics.

In the present embodiment, the reaction force hold time Xh is set as a time required to suppress pedaling of the pedal lever 20 when a reaction force is applied, and after the reaction force hold time Xh has elapsed, the reaction force is reduced as a function of time to return to the original pedaling characteristics. In such manner, after the reaction force hold time Xh has elapsed, the reaction force is gradually reduced by the reaction force reduction control, thereby (a) suppressing difficulty in the pedaling of the pedal lever 20 compared to a case when the reaction force is maintained, and (b) enabling a discomfort-free pedaling operation regardless of whether to perform a steep acceleration or a moderate acceleration, when the driver continues to operate the pedal lever 20 with an intention to accelerate.

As described above, the accelerator device 1 includes the pedal lever 20, the motor 31, the power transmission mechanism 40, and the control unit 60. The pedal lever 20 is operable in response to pedaling. The motor 31 generates a driving force when being energized. The power transmission mechanism 40 transmits the driving force of the motor 31 to the pedal lever 20, and applies a reaction force in the opposite direction to the pedaling direction of the pedal lever 20.

The control unit 60 includes the reaction force controller 65 that controls the motor 31 for a control of the reaction force applied to the pedal lever 20. The reaction force controller 65 holds the initial reaction force F0 for the reaction force hold time Xh from the start of reaction force application, and after the reaction force hold time Xh has elapsed, performs reaction force reduction control to reduce the reaction force as a function of time. In such manner, the reaction force is appropriately applicable, thereby making it possible to prevent an unintended pedaling operation due to steep fluctuations in the reaction force. Also, the pedaling operation is made to correspond to the driver's intention to accelerate.

The reaction force controller 65 sets the reaction force hold time Xh based on the pedaling speed Vs at the control start time, which is a pedaling speed of the pedal lever 20 at the start of reaction force application. In the present embodiment, the reaction force hold time Xh is made shorter as the pedaling speed Vs at the control start time increases. In such manner, the pedaling operation is made to correspond to the driver's intention to accelerate.

The reaction force controller 65 sets the reaction force reduction time Xd during which the reaction force reduction control is performed, based on the pedaling speed Vs at the control start time. In the present embodiment, the reaction force reduction time Xd is made longer as the pedaling speed Vs at the control start time increases. In such manner, it is possible to suppress excessive pedaling of the pedal due to a reduced reaction force, while allowing the pedaling operation to correspond to the driver's intention.

Second Embodiment

Figure 6:
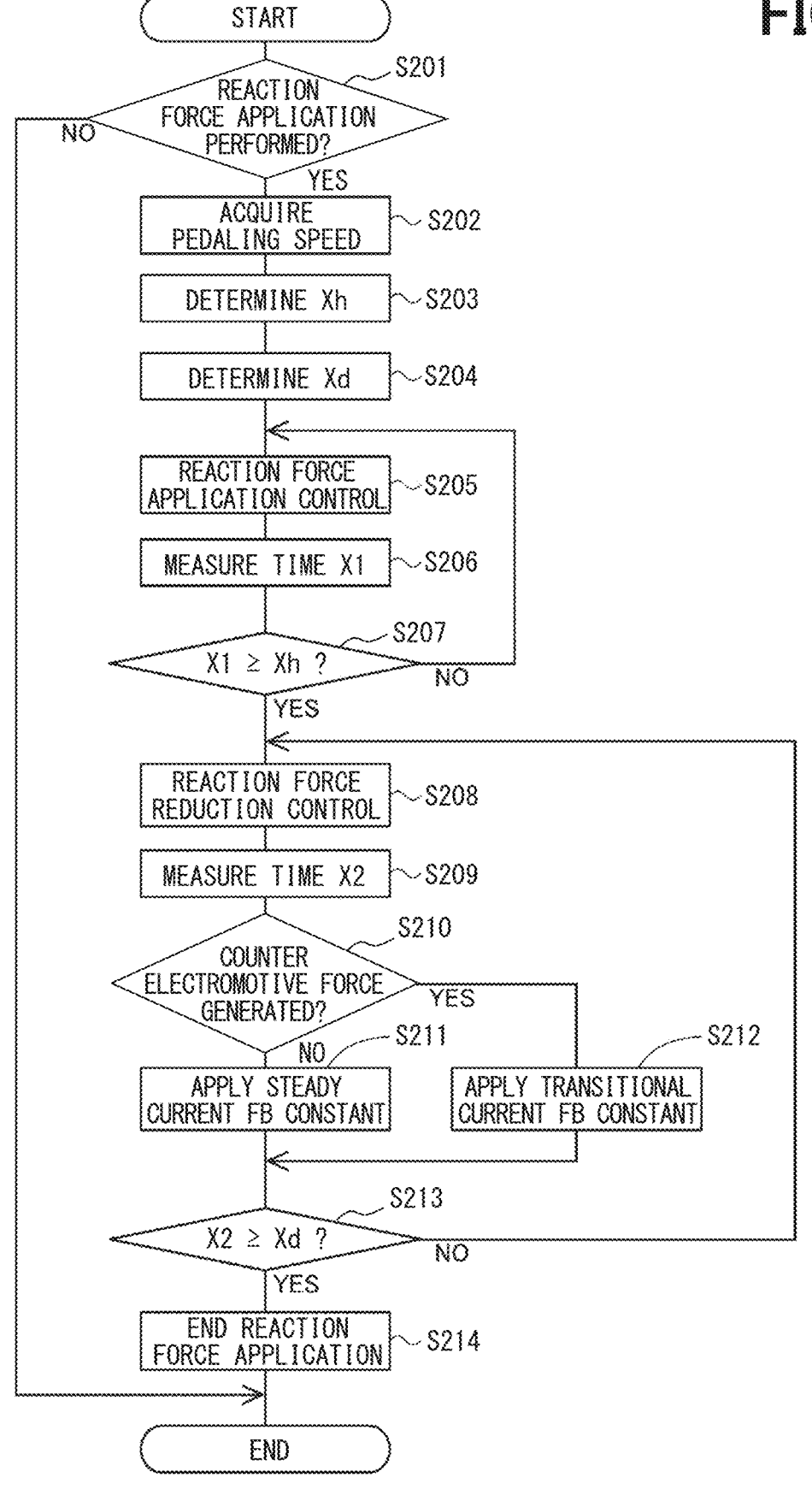
FIG. 6 is a flowchart for explaining a reaction force application control according to a second embodiment.
Figure 7:
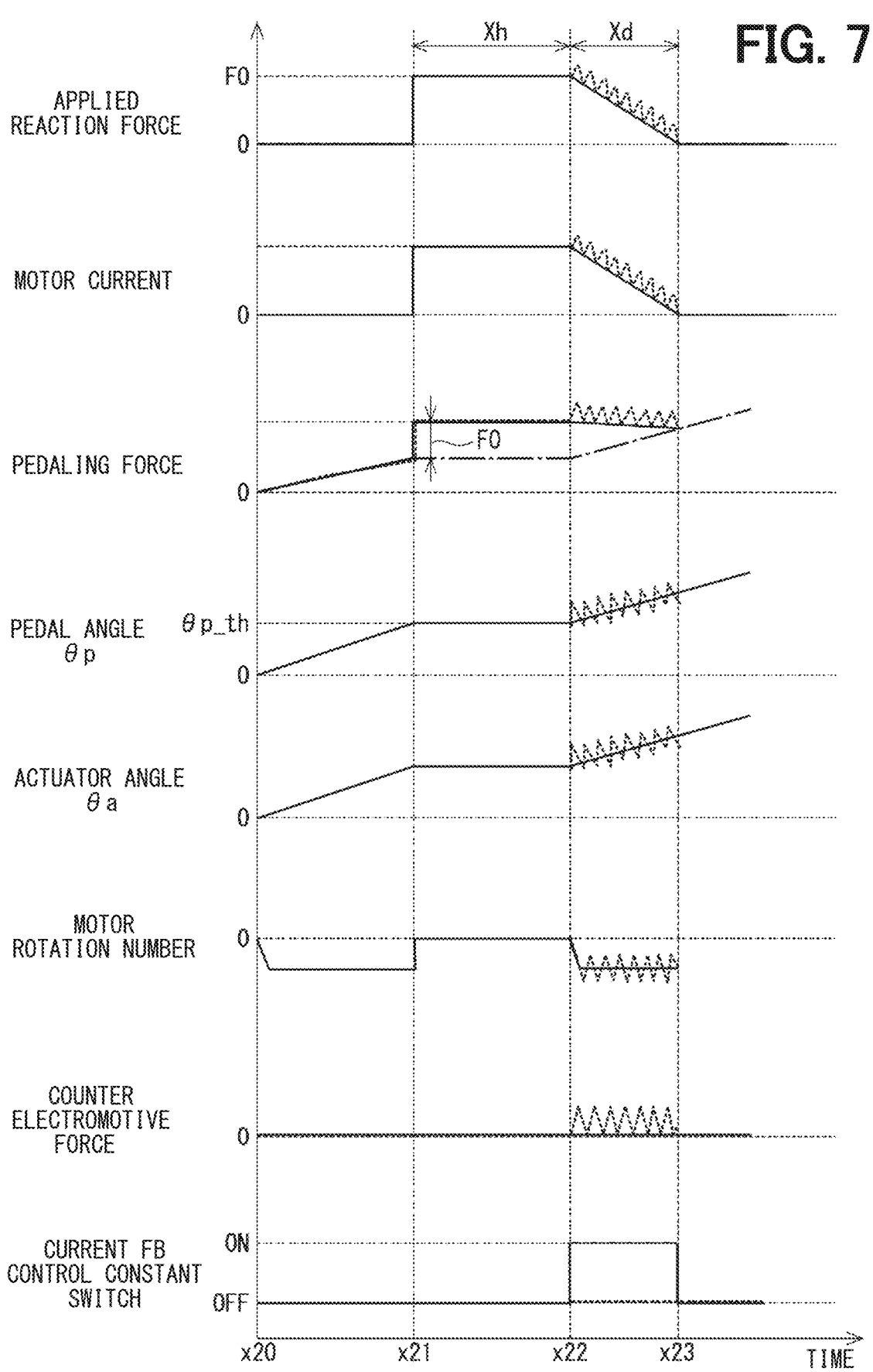
FIG. 7 is a time chart for explaining the reaction force application control according to the second embodiment.

The second embodiment is described based on FIGS. 6 and 7. When a pedal lever 20 is stepped in a state that a motor 31 is energized and a reaction force is being applied, a power transmission mechanism 40 rotates in a direction opposite to the reaction force application direction, thereby generating a counter electromotive force. If the reaction force fluctuates due to the generation of counter electromotive force, drivability may deteriorate.

In order to cancel the effect of the counter electromotive force generated when the driver pedals the pedal, the drive of the motor 31 is controlled based on the electric current feedback control, thereby suppressing the fluctuation of the applied reaction force. In particular, in the present embodiment, when a counter electromotive force is generated, the feedback constant is switched to a value corresponding to a transitional change of electric current, thereby suppressing the fluctuation of the applied reaction force.

A process of a reaction force application control of the present embodiment is described with reference to a flowchart of FIG. 6. The processes in S201 to S209 are similar to those in S101 to S109 in FIG. 2, respectively. In S210, which is subsequent to S209, a control unit 60 determines whether or not a counter electromotive force is generated. In the present embodiment, an affirmative determination is made when it is determined that a counter electromotive force equal to or greater than a determination threshold is generated based on a detection value of a position sensor 49. When it is determined that no counter electromotive force is generated (S210: NO), the process proceeds to S211, and when it is determined that a counter electromotive force is generated (S210: YES), the process proceeds to S212.

In S211, a reaction force controller 65 applies a steady control constant and performs the electric current feedback control. In S212, a transitional control constant is applied to perform the electric current feedback control. When a counter electromotive force is generated, a transitional change occurs. Therefore, the control constant is switched to a transitional control constant. The transitional control constant is set so that a proportional term and an integral term become smaller than those in the steady control constant. The processes of S213 and S214 are similar to the processes of S110 and S111 in FIG. 2.

The reaction force application control of the present embodiment is described with reference to a time chart of FIG. 7. In FIG. 7, the horizontal axis represents a common time axis, and from the top, an applied reaction force, a motor current, a pedaling force, a pedal angle, an actuator angle, a motor rotation number, a counter electromotive force, and an electric current feedback control constant switch are shown. The solid line indicates a case where the electric current feedback control is performed, and the broken line indicates a case where the electric current feedback control is not performed. Regarding the pedaling force, the pedaling force applied by the driver is indicated by the one-dot chain line.

The process from time x20 to time x22 is similar to the process from time x10 to time x12 in FIG. 3. At time x22 when the reaction force hold time Xh has elapsed from the start of reaction force application, a reaction force reduction control is started. When the driver increases the pedaling force and pedals the pedal lever 20 as the applied reaction force decreases, the motor 31 rotates in a direction opposite to the reaction force application direction, generating a counter electromotive force. As shown by the broken line, when the electric current feedback control is not performed when a counter electromotive force is generated, the applied reaction force fluctuates, and drivability deteriorates.

Therefore, in the present embodiment, the fluctuation of the applied reaction force is suppressed by performing the electric current feedback control. Further, in the electric current feedback control, since a transitional change occurs during the generation of the counter electromotive force, the electric current feedback control constant switch is turned on at time x22 to switch to the transitional control constant, thereby further suppressing fluctuations in the applied reaction force. When the applied reaction force becomes 0 at time x23, the electric current feedback control constant switch is turned off, and the control constant is returned to the steady control constant.

In the reaction force reduction control, the reaction force controller 65 switches the control constant in the electric current feedback control to a value different from the steady control constant in accordance with the counter electromotive force of the motor 31. In such manner, it is possible (a)

to suppress fluctuations in the applied reaction force due to the counter electromotive force, and (b) to prevent deterioration of drivability. The second embodiment also provides the same effect as the preceding embodiment.

In the present embodiment, the motor 31 corresponds to a "drive source," and the pedaling speed Vs at the control start time corresponds to a "pedaling speed of the pedal lever at a start of reaction force application."

OTHER EMBODIMENTS

In the embodiments described above, the reaction force hold time and the reaction force reduction time are made variable according to the pedaling speed at a control start time. In other embodiments, at least one of the reaction force hold time and the reaction force reduction time may be set to a predetermined value regardless of the pedaling speed at the control start time. In the second embodiment, the current feedback constant is switched according to the counter electromotive force. In other embodiments, when the counter electromotive force is small, the current feedback constant may be not switched. Further, the drive source may be controlled by a control method other than the electric current feedback control.

In the embodiments described above, the drive source is a brushed DC motor. In other embodiments, a motor other than a brushed DC motor or something other than a motor may be used as the drive source. Further, the configuration of the power transmission mechanism and the arrangement of parts may be different from those in the embodiment.

The present disclosure may be provided as "an accelerator device according to any one of aspects 1 to 3, wherein the reaction force controller switches a control constant in the electric current feedback control to a value different from that of a steady control constant in accordance with a counter electromotive force of the drive source during the reaction force reduction control".

The control unit and method described in the present disclosure may be realized by a dedicated computer which is configured with a memory and a processor programmed to execute one or more particular functions embodied in computer programs in the memory. Alternatively, the control unit and the method according to the present disclosure may be realized by a dedicated computer provided by constituting a processor with one or more dedicated hardware logic circuits. Alternatively, the control unit and the method according to the present disclosure may be realized as a combination of (a) a processor programmed for performing one or more functions and a memory and (b) a processor configured by at least one hardware logic circuit. Further, the computer programs may be stored, as instructions to be executed by a computer, in a non-transitory, tangible computer-readable storage medium. The present disclosure is not limited to the above embodiments, but various modifications may be made further within the scope of the present disclosure without departing from the spirit of the disclosure.

The present disclosure has been made in accordance with the embodiments. However, the present disclosure is not limited to such embodiments and configurations. The present disclosure also encompasses various modifications and variations within the scope of equivalents. Further, various combinations and formations, and other combinations and formations including one, more than one or less than one element may also be encompassed in the present disclosure.

What is claimed is:

1. An accelerator device comprising:

a pedal lever configured to be operable in response to a pedaling operation;

a drive source configured to generate a driving force when being energized;

a power transmission mechanism configured to transmit the driving force of the drive source to the pedal lever, and to apply a reaction force in an opposite direction to a pedaling direction of the pedal lever; and a control unit including a reaction force controller configured to control the reaction force applied to the pedal lever by controlling the drive source, wherein when a reaction force application condition is satisfied during a vehicle travel, the reaction force controller holds an initial reaction force for a reaction force hold time from a start of the reaction force applied to the pedal lever, and to perform a reaction force reduction control in which the reaction force is reduced by a time function after an elapse of the reaction force hold time; and the reaction force controller sets a reaction force reduction time, for which the reaction force reduction control is performed, based on a pedaling speed of the pedal lever at the start of the reaction force applied to the pedal lever.

2. The accelerator device according to claim 1, wherein the reaction force controller sets the reaction force hold time based on the pedaling speed of the pedal lever at the start of the reaction force applied to the pedal lever.

3. An accelerator device comprising:

a pedal lever configured to be operable in response to a pedaling operation;

a drive source configured to generate a driving force when being energized;

a power transmission mechanism configured to transmit the driving force of the drive source to the pedal lever, and to apply a reaction force in an opposite direction to a pedaling direction of the pedal lever; and a control unit including a reaction force controller configured to control the reaction force applied to the pedal lever by controlling the drive source, wherein when a reaction force application condition is satisfied during a vehicle travel, the reaction force controller holds an initial reaction force for a reaction force hold time at a start of the reaction force applied to the pedal lever, and to perform a reaction force reduction control in which the reaction force is reduced by a time function after an elapse of the reaction force hold time, the reaction force controller sets the reaction force hold time based on a start pedaling speed of the pedal lever at the start of the reaction force applied to the pedal lever, (i) to be a minimum hold time when the start pedaling speed is greater than a first predetermined value, and (ii) to be shorter in accordance with an increase of the start pedaling speed in a range where the start pedaling speed is equal to or less than the first predetermined value.

4. The accelerator device according to claim 3, wherein the reaction force controller sets the reaction force hold time (i) to be shorter in accordance with the increase of the start pedaling speed in the range where the start pedaling speed is equal to or less than the first predetermined value and is greater than a second predetermined value that is a value less than the first predetermined value, and (ii) to be a maximum hold time when the start pedaling speed is equal to or less than the second predetermined value.

5. The accelerator device according to claim 4, wherein the reaction force controller sets the reaction force hold time (i) to be linearly shorter in accordance with the increase of the start pedaling speed in the range where the start pedaling speed is equal to or less than the first predetermined value and is greater than the second predetermined value that is a value less than the first predetermined value, and (ii) to be the maximum hold time when the start pedaling speed is equal to or less than the second predetermined value.

6. The accelerator device according to claim 4, wherein the reaction force controller sets the reaction force hold time (i) to be non-linearly shorter in accordance with the increase of the start pedaling speed in the range where the start pedaling speed is equal to or less than the first predetermined value and is greater than the second predetermined value that is a value less than the first predetermined value, and (ii) to be the maximum hold time when the start pedaling speed is equal to or less than the second predetermined value.

7. The accelerator device according to claim 3, wherein the reaction force controller sets the reaction force hold time based on the start pedaling speed of the pedal lever at the start of the reaction force applied to the pedal lever, (i) to be the minimum hold time when the start pedaling speed is greater than the first predetermined value, and (ii) to be linearly shorter in accordance with the increase of the start pedaling speed in the range where the start pedaling speed is equal to or less than the first predetermined value.

8. The accelerator device according to claim 3, wherein the reaction force controller sets the reaction force hold time based on the start pedaling speed of the pedal lever at the start of the reaction force applied to the pedal lever, (i) to be the minimum hold time when the start pedaling speed is greater than the first predetermined value, and (ii) to be non-linearly shorter in accordance with the increase of the start pedaling speed in the range where the start pedaling speed is equal to or less than the first predetermined value.

9. An accelerator device comprising:
a pedal lever configured to be operable in response to a pedaling operation;
a drive source configured to generate a driving force when being energized;
a power transmission mechanism configured to transmit the driving force of the drive source to the pedal lever, and to apply a reaction force in an opposite direction to a pedaling direction of the pedal lever; and a control unit including a reaction force controller configured to control the reaction force applied to the pedal lever by controlling the drive source, wherein
when a reaction force application condition is satisfied during a vehicle travel, the reaction force controller holds an initial reaction force for a reaction force hold time from a start of the reaction force applied to the pedal lever, and to perform a reaction force reduction control in which the reaction force is reduced by a time function after an elapse of the reaction force hold time; and
the reaction force controller switches a control constant in an electric current feedback control including a proportional control and an integral control to a value different from that of a steady control constant such that a proportional term and an integral term become smaller in the electric current feedback control, when a counter electromotive force equal to or greater than a determination threshold is generated in the drive source, in the reaction force reduction control.

10. An accelerator device comprising:
a pedal lever configured to be operable in response to a pedaling operation;
a drive source configured to generate a driving force when being energized;
a power transmission mechanism configured to transmit the driving force of the drive source to the pedal lever, and to apply a reaction force in an opposite direction to a pedaling direction of the pedal lever; and
a controller including at least one of a circuit and a processor having a memory, wherein the controller is configured
to control the reaction force applied to the pedal lever by controlling the drive source,
to determine whether a reaction force application condition is satisfied during a vehicle travel, and
to hold an initial reaction force for a reaction force hold time from a start of the reaction force applied to the pedal lever, and to perform a reaction force reduction control in which the reaction force is reduced by a time function after an elapse of the reaction force hold time, when the reaction force application condition is satisfied during the vehicle travel; and
to set a reaction force reduction time, for which the reaction force reduction control is performed, based on a pedaling speed of the pedal lever at the start of reaction force applied to the pedal lever.

\* \* \* \* \*